May 25, 1948.
S. W. SEELEY
2,442,097
ELECTRICAL NETWORK FOR PHASE SHIFTERS
Filed June 18, 1946
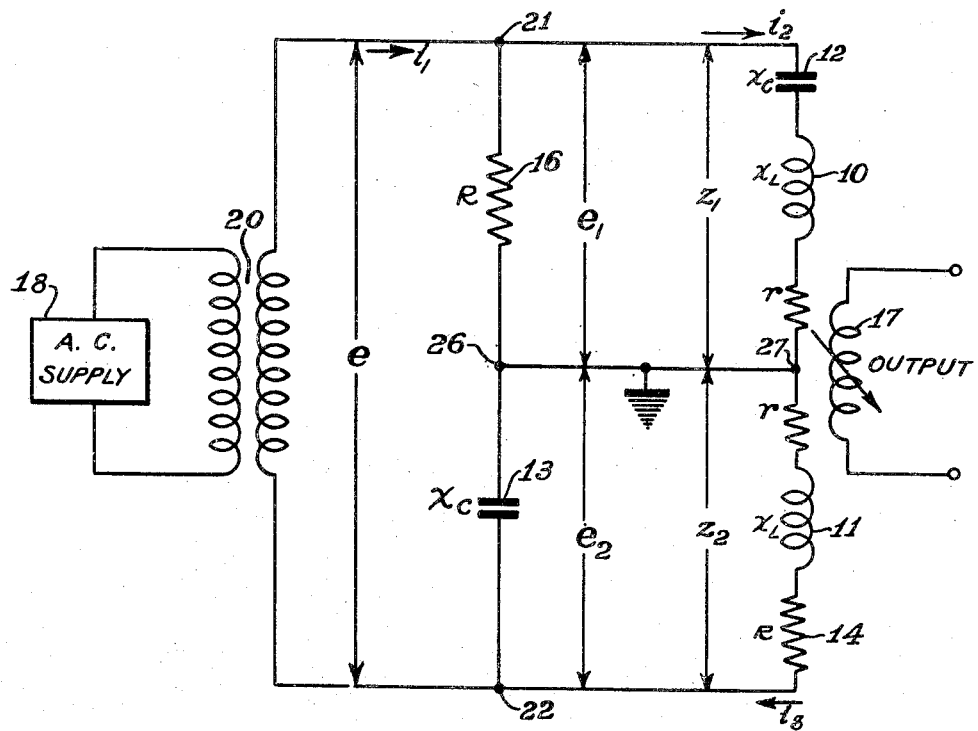
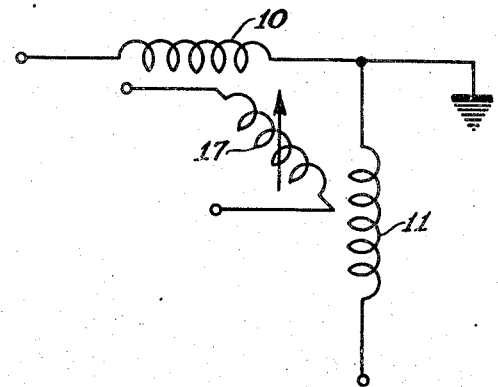
INVENTOR.
*Stuart W. Seeley*
BY
*Attorney*

Patented May 25, 1948

2,442,097

UNITED STATES PATENT OFFICE 2,442,097

ELECTRICAL NETWORK FOR PHASE SHIFTERS

Stuart W. Seeley, Roslyn Heights, N. Y., assignor to Radio Corporation of America, a corporation of Delaware Application June 18, 1946, Serial No. 677,450

9 Claims. (Cl. 323—123)

My invention relates to electrical networks and particularly to an electrical network for obtaining quadrature currents and/or quadrature voltages.

An object of the invention is to provide an improved and simplified circuit for providing quadrature currents and/or quadrature voltages.

A further object of the invention is to provide an improved circuit for supplying quadrature currents whose phases are not affected by ambient temperature changes.

A still further object of the invention is to provide an improved circuit and apparatus for shifting the phase of a sine wave signal.

In my copending application Serial No. 548,183, filed August 5, 1944, and entitled Electrical networks for phase shifters, there is described and claimed a double bridge network for obtaining quadrature currents and/or voltages which is particularly useful where quadrature currents are to be supplied to two goniometer phase shifters.

The present invention is particularly useful where quadrature currents are to be supplied to a single phase shifter such as a crossed-coil goniometer. It comprises a circuit less complicated than that of my copending application but it still has the advantage, among others, that the phases of the quadrature current are not affected by changes in the ambient temperature. Temperature changes may cause large changes in the resistance of the goniometer coils. While it is feasible to temperature compensate capacitors and resistors, this is practically impossible in the case of the goniometer coils.

The invention will be described by referring to the accompanying drawing in which Figure 1 is a circuit diagram of a preferred embodiment of the invention and Figure 2 is a diagrammatic view of the goniometer phase shifter that is included in the circuit of Fig. 1.

The circuit of Fig. 1 contains a combination of resistors, capacitors, and inductors. As stated, one of the objects of the invention is to make the circuit immune to the effects of ambient temperature variations to the extent that such temperature changes will have practically no effect on the phase of impedance of the load which the circuit exhibits to the supply voltage nor on the phases of the currents which flow through the inductors. Thus an object of the invention is to cause the relative phases of the currents flowing in the two inductors to remain fixed with respect to each other and fixed with respect to the source supply voltage.

The resistors used in a circuit such as that of Fig. 1 may be made of low temperature coefficient material so that they exhibit little or no change as a result of wide temperature variations. The capacitors may either be made with low temperature coefficients or be temperature compensated so that they will exhibit practically a zero temperature coefficient. Likewise, the inductances of the coils, which in the present case are the crossed windings of a goniometer, may be so constructed that the reactive component of their impedance at a given frequency is practically independent of the temperature of the windings. However, the inherent resistances of the inductors will tend to vary widely with the operating temperature and thus alter the phase angle, or power factor, of the windings.

In the following description, Q is defined as the ratio of the reactive impedance to the resistance of an inductance such as that of the coil 10 or the coil 11 of Fig. 1. Since the resistive components of such coils, shown as r of Fig. 1, can vary by as much as several hundred percent under the influence of temperature variations, the Q's will also vary to the same extent. Thus under extreme temperature variations, the power factor of the inductors of the operating frequency might, for example, be changed from 3 percent to 12 percent with a corresponding variation in their impedance phase angle. Thus, as stated, one of the objects of this invention is to provide a circuit in which variations in the phase angle of the impedances of a pair of inductors cause no variations in the phases of the currents which flow through those impedances.

Referring to the drawing, the stator or cross coils 10 and 11 of a cross-coil goniometer type phase shifter are included in two branches or arms of a four-branch network. The two branches including coils 10 and 11 also include a capacitor 12 and a resistor 14, respectively. The effective resistances of the coils 10 and 11 are represented by the resistors r. The reactance of the capacitor 12 is equal to the reactance of the coil 10 at the frequency of the signal source.

A third branch of the network comprises a resistor 16 which is connected in parallel with the branch 10, 12. The resistor 16 has the same resistance R as resistor 14. A fourth branch of the network comprises a capacitor 13 of the same value as the capacitor 12, this branch being in parallel with the branch 11, 14.

The rotor of the phase shifter is indicated at 17. It will be understood that the stator coils 10 and 11 are displaced 90 degrees in space as represented schematically in Fig. 2, and that it is desired to have the current in coil 10 displaced 90 degrees with respect to the current in coil 11.

The sine wave current or signal E of voltage e that is to be shifted in phase is applied from a source 18 and through a transformer 20, if desired, across the network by way of the terminals 21 and 22. It will be noted that the electrical midpoint of the signal supply is not grounded, that is, it is "floating." The junction point 26 of the network branches 16 and 13 and the junction point 21 of the network branches 12, 10 and 11, 14 which are connected together generally will be grounded.

In the circuit described, the resistances of the resistors 14 and 16 are equal and of the value R. The capacities of the capacitors 12 and 13 are equal and each presents the reactance $X_c$ to the applied signal E. Also, $R=X_c$ at the frequency of the signal E. The Q's of the coils 10 and 11 may be of any practical value but must be equal to each other and be equally affected by changes in ambient temperature so that they remain alike under all operating conditions. Then $i_2=ji_3$ where $i_2$ and $i_3$ are the currents flowing through the coils 10 and 11, respectively.

The coils 10 and 11 are identical so that each coil presents the impedance $X_L$ to the signal E. Also numerically $X_L=X_c=R$ at the frequency of the signal E. Then variations in the Q of the coils 10 and 11, such as those due to ambient temperature changes, make no difference in the phase relation of the currents $i_2$ and $i_3$ with respect to the signal E, assuming the Q's of the two coils remain alike.

The foregoing can be shown as follows:

Let the voltage $e$ applied to the network terminals 21, 22 equal 1 volt and let R equal 1 ohm, for example.

Then $$Z_1=\frac{r}{1+r}$$

where $Z_1$ is the impedance of the branch 16 and the branch 10, 12 in parallel at the frequency of the supply voltage E, the reactance $X_c$ and $X_L$ cancelling out at this frequency.

Similarly $$Z_2=\frac{(1+j+r)(-j)}{1+r}=\frac{1-j-jr}{1+r}$$

where $Z_2$ is the impedance of the branch 13 and the branch 11, 14 in parallel at the frequency of the supply voltage E.

$$Z_1+Z_2=\frac{1+r-j-jr}{1+r}=\frac{(1+r)-j(1+r)}{1+r}=1-j$$

Therefore, $$i_1=\frac{e}{1-j}=\frac{1}{1-j}$$

It is now apparent that the current $i_1$ is fixed in phase with respect to the supply voltage in spite of variations in the Q's of the goniometer coils 10 and 11 since $r$ does not appear in the equation for $i_1$. The current $i_1$ is also of constant amplitude regardless of changes in the Q's of the coils 10 and 11.

It can now be shown that the currents $i_2$ and $i_3$ through the coils 10 and 11, respectively, are in phase quadrature.

$$e_1=i_1Z_1=\frac{1}{1-j}\times\frac{r}{1+r}$$

where $e_1$ is the voltage across the branches 16 and 10, 12.

$$i_2=\frac{e_1}{r}$$

at the supply voltage frequency since $X_c+X_L=0$. Then $$i_2=\frac{1}{(1-j)(1+r)}$$

Also, $$e_2=i_1Z_2=\frac{1}{1-j}\times\frac{1-j-jr}{1+r}$$

where $e_2$ is the voltage across the branches 13 and 11, 14 in parallel.

Then $$i_3=\frac{e_2}{1+r+j}=\frac{(1-j-jr)}{(1-j)(1+r)(1+r+j)}$$
$$=\frac{(1-j-jr)}{(1-j)(1+r)(1+r+j)}\times\frac{j}{j}=$$
$$\frac{j+1+r}{(1-j)(1+r)(1+r+j)(j)}$$
$$=\frac{1}{(1-j)(1+r)(+j)}=-j\times\frac{1}{(1-j)(1+r)}=-ji_2$$

Therefore, regardless of the value of $r$, i. e., regardless of the Q's of the coils 10 and 11, $i_3=-ji_2$ and the currents through the two coils 10 and 11 are always in quadrature as desired.

The fact that $i_2$ has a fixed phase with respect to the supply voltage E can be seen from the following:

$$i_2=\frac{1}{(1-j)(1+r)}\times\frac{1+j}{1+j}=\frac{1+j}{(1-j)(1+j)(1+r)}$$
$$=\frac{1+j}{2(1+r)}=\frac{1}{2(1+r)}(1+j)$$

Since the term $(1+j)$ is independent of $r$, the phase of $i_2$ is constant regardless of changes in the Q's of the coils 10 and 11.

Thus it has been shown—

(1) That the current $i_1$ going into the network is constant in amplitude and phase regardless of variations in the Q's of the goniometer coils 10 and 11 and (2) That the phases of the currents $i_2$ and $i_3$ in the goniometer coils 10 and 11, respectively, remain fixed with respect to the supply voltage and fixed with respect to each other in the presence of changes in the Q's of the coils. It may be noted, however, that the magnitude of the currents through the coils 10 and 11 is altered by changes in the coil Q's, a fact that ordinarily is of little consequence.

As one example of the invention it may be mentioned that the frequency of the sine wave signal E was 10 kc., the value of R was 795 ohms and the capacity of each capacitor 12 and 13 was 0.02 mfd.

From the foregoing it will be seen that I have provided a simple circuit that makes it possible to obtain a precise phase shift that is not affected by changing conditions such as ambient temperature. Circuits of this character are useful in position determining radar systems such as Loran and Shoran systems, for example.

I claim as my invention:

1. In a circuit for causing currents to flow through two like inductance coils with the currents displaced in phase by an amount that is fixed regardless of variations in the Q's of the coils, two parallel circuits that are connected in series with each other to form a series combination, said series combination being connected in series with a supply voltage source, one of said coils being in one branch of one of said parallel circuits, the other of said coils being in one branch of the other of said parallel circuits, said one coil being tuned in said one branch to series resonance at the frequency of said source, said one parallel circuit being resistive at said frequency, said other parallel circuit being capacitive at said frequency whereby the current flow through said series combination is leading with respect to the supply voltage and whereby the current flowing through the coil in said other parallel circuit is lagging with respect to said supply voltage, the current through the coil in said one parallel circuit being in phase with the current flowing through said series combination.

2. In a circuit for causing currents to flow through two like inductance coils with the currents displaced in phase quadrature regardless of variations in the Q's of the coils, two parallel circuits that are connected in series with each other to form a series combination, said series combination being connected in series with a supply voltage source, the electrical midpoint of said source being floating, one of said coils being in one branch of one of said parallel circuits, the other of said coils being in one branch of the other of said parallel circuits, said one coil being tuned by a capacitor in said one branch to series resonance at the frequency of said course, said one parallel circuit having only a resistor in its other branch which has a resistance equal to the reactance of one of said coils at said frequency, said other parallel circuit being capacitive at said frequency whereby the current flow through said series combination is leading with respect to the supply voltage and whereby the current flowing through the coil in said other parallel circuit is lagging with respect to said supply voltage, the current through the coil in said one parallel circuit being in phase with the current flowing through said series combination, said other parallel circuit having a resistor in series with said one coil in one branch and having a capacitor in parallel with said last-mentioned branch, said last-mentioned resistor having the same resistance as said first-mentioned resistor, and said last-mentioned capacitor having the same capacity as said first-mentioned capacitor.

3. An electrical network for deriving from a single phase source currents having a fixed phase difference, said network comprising a four-branch network comprising two branches which are in series with each other and in series with said source, one of said two branches comprising a first reactive element and a reactive element of a different kind but of the same reactance as said first reactive element at the frequency of said source, the second of said two branches comprising a second reactive element of the same kind as said first reactive element and further comprising in series therewith a resistor having a resistance R, said first and second reactive elements having like reactance and resistance, a third branch comprising a resistor of resistance R connected in parallel with said first branch, and a fourth branch comprising a reactive element of said different kind connected in parallel with said second branch and having a reactance equal to that of said first reactance element of said different kind at the frequency of said source whereby the currents flowing through said first and second reactive elements have a fixed phase difference with respect to each other.

4. An electrical network for deriving from a single phase source currents having a fixed phase difference, said network comprising a four-branch network comprising two branches which are in series with each other and in series with said source, one of said two branches comprising a reactive element of a phase shifter and a reactive element of a different kind but of the same reactance as said first reactive element at the frequency of said source, the second of said two branches comprising a second reactive element of said phase shifter and further comprising in series therewith a resistor having a resistance R, said two reactive elements of the phase shifter having like reactance and resistance, a third branch comprising a resistor of resistance R connected in parallel with said first branch, and a fourth branch comprising a reactive element of said different kind connected in parallel with said second branch and having a reactance equal to that of said first reactance element of said different kind at the frequency of said source whereby the currents flowing through the two reactive elements of said phase shifter have a fixed phase difference with respect to each other.

5. The invention according to claim 4 wherein the resistance R is equal to the reactance of each of said reactive elements at the frequency of said source.

6. An electrical network for deriving quadrature phase currents from a single phase source, said network comprising a four-branch network comprising two branches which are in series with each other and in series with said source, one of said two branches comprising an inductance coil and further comprising in series therewith a capacitor of the same reactance as said coil at the frequency of said source, the second of said two branches comprising a second inductance coil and further comprising in series therewith a resistor having a resistance R, said two coils having like reactance and resistance, a third branch comprising a resistor of resistance R connected in parallel with said first branch, and a fourth branch comprising a capacitor connected in parallel with said second branch and having the same capacity value as the capacitor in said one branch whereby the currents flowing through said two coils are in quadrature.

7. An electrical network for deriving quadrature phase currents from a single phase source, said network comprising a four-branch network comprising two branches which are in series with each other and in series with said source, one of said two branches comprising a cross-coil of a goniometer and further comprising in series therewith a capacitor of the same reactance as said cross-coil at the frequency of said source, the second of said two branches comprising the second cross-coil of said goniometer and further comprising in series therewith a resistor having a resistance R, said two cross-coils of the goniometer having like reactance and resistance, a third branch comprising a resistor of resistance R connected in parallel with said first branch, and a fourth branch comprising a capacitor connected in parallel with said second branch and having the same capacity value as the capacitor in said one branch whereby the currents flowing through said two cross-coils are in quadrature.

8. The invention according to claim 7 wherein the resistance R is equal to the reactance of each of said cross-coils at the frequency of said source.

9. The invention according to claim 7 wherein the reactance of each of said cross-coils equals the resistance R at the frequency of said source and wherein the Q of each coil is less than one.

STUART W. SEELEY.